United States Patent [19]
Ben-Nasr et al.

[11] Patent Number: 5,229,000
[45] Date of Patent: Jul. 20, 1993

[54] APPARATUS AND METHOD FOR THE SEPARATION OF A VISCOUS MIXTURE

[75] Inventors: Hedi Ben-Nasr, Gelsenkirchen; Ernst Kriegel; Klaus Reimann, both of Essen, all of Fed. Rep. of Germany

[73] Assignee: Fried. Krupp GmbH, Essen, Fed. Rep. of Germany

[21] Appl. No.: 674,930

[22] Filed: Mar. 26, 1991

[30] Foreign Application Priority Data
Mar. 31, 1990 [DE] Fed. Rep. of Germany ....... 4010400

[51] Int. Cl.⁵ .............................................. B01D 11/04
[52] U.S. Cl. .................................................... 210/634
[58] Field of Search ...................... 66/252; 423/658.5; 427/213.2; 208/311; 210/634

[56] References Cited

U.S. PATENT DOCUMENTS

4,367,178  1/1983  Heigel et al.
4,492,720  1/1985  Mosier ........................ 427/213.3
4,560,513  12/1985  Coenen et al.
4,736,792  4/1988  Brown et al. .................... 166/252

FOREIGN PATENT DOCUMENTS

1251620  3/1989  Canada .
156374  10/1985  European Pat. Off. .

*Primary Examiner*—Frank Sever
*Attorney, Agent, or Firm*—Spencer, Frank & Schneider

[57] ABSTRACT

A method and apparatus for the separation of viscous mixtures, comprising charging the mixture with solvent to form a dispersion before extraction to improve the extraction over a simple solvent extraction. The mixture to be treated is charged with solvent before the extraction and is then sprayed into the extraction column where it is dispersed. This treatment provides extraction of highly viscous, pasty materials. The charging with solvent can take place until the mixture is saturated with the solvent, and favorable temperature and pressure conditions for charging may be provided in a charging column that is separate from the extraction column.

26 Claims, 1 Drawing Sheet

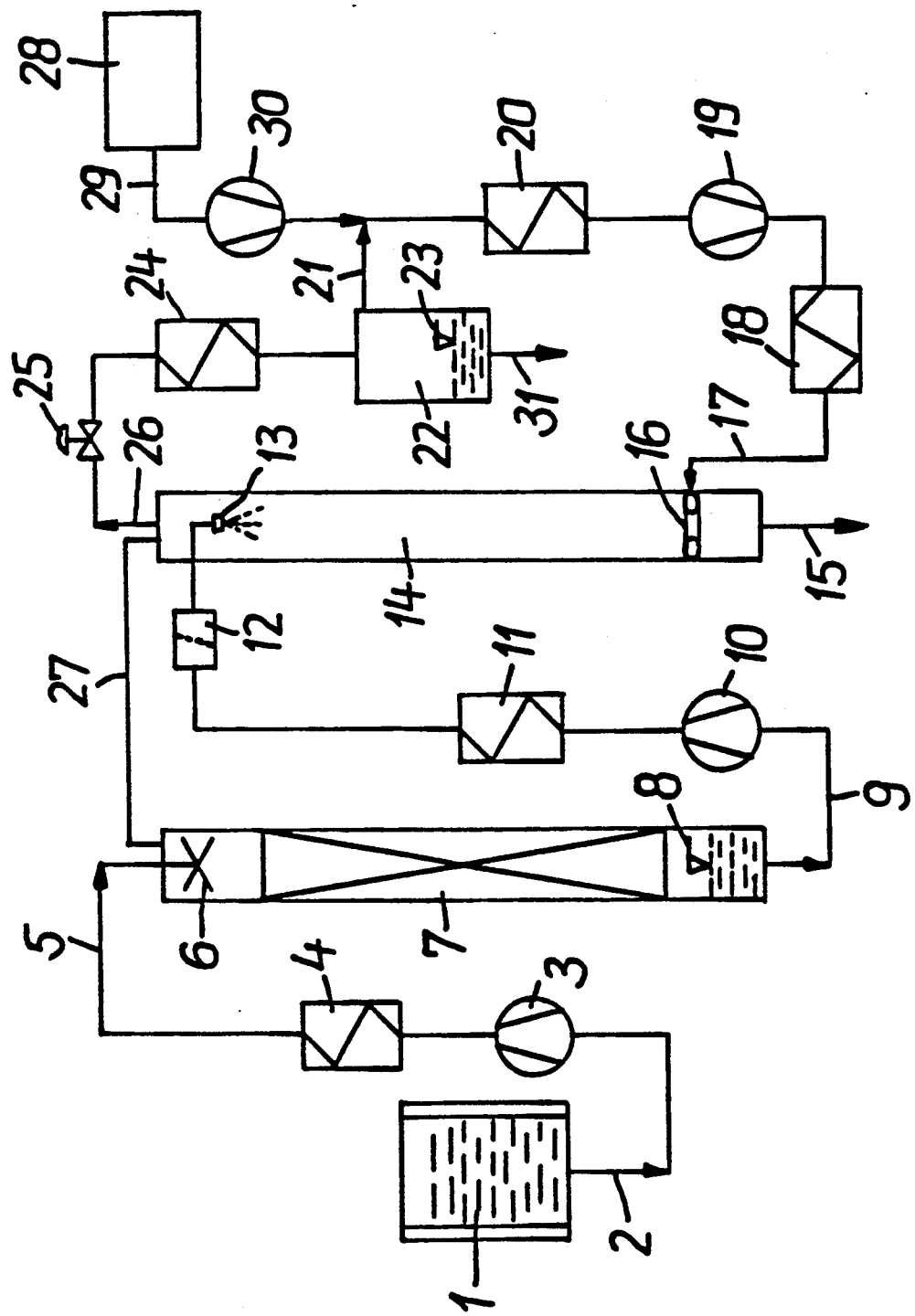

APPARATUS AND METHOD FOR THE SEPARATION OF A VISCOUS MIXTURE

CROSS-REFERENCE TO RELATED APPLICATION

This application is related to application No. P 4,010,400.1 filed Mar. 31, 1990 in the Patent Office of the Federal Republic of Germany, the entire specification of which is incorporated herein by reference.

FIELD OF THE INVENTION

This invention relates to an apparatus and method for the separation of a viscous mixture.

TECHNOLOGY REVIEW

Known methods for the separation of mixtures are limited to mixtures which are already sufficiently dispersible to permit effect further processing. Difficulties are encountered in the separation of certain mixtures. For example, the conventional separation of highly viscous, pasty mixtures is by solvent extraction of the soluble components, which is a widely applied processing technique in the chemical and allied industries. In solvent extraction, a mixture of different substances is separated by the use of a solvent. A solvent is a material capable of dissolving another material (solute) to form a homogeneous system composed of more than one chemical substance: a solution. To effect a separation by solvent extraction, at least one of the components of the mixture must be insoluble or at least only partially soluble in the solvent. As an example of solvent extraction, the oil in raw lecithin is separated using acetone, and insoluble pure lecithin is recovered. This is unsatisfactory in many applications, particularly in the food processing art because traces of the toxic solvents remain in the product.

German Offenlegungsschrift No. 3,536,622 and corresponding U.S. Pat. Nos. 4,812,233 and 4,828,702 disclose processes that use gaseous solvents under normal conditions. These gaseous solvents are non-toxic and leave hardly any residual traces. Entrainers are added to increase the extraction effect.

Subcritical or supercritical carbon dioxide are usually recommended as solvents, as well as simple or halogenized hydrocarbons or mixtures thereof. By subcritical or supercritical carbon dioxide is meant the property of carbon dioxide which is below or above, respectively, its critical temperature and pressure. Critical temperature is that temperature above which a substance can exist only as a gas. Critical pressure is the pressure that must be applied to a substance at its critical temperature in order to achieve a liquid-vapor equilibrium.

German Offenlegungsschrift No. 3,011,185 and corresponding U.S. Pat. No. 4,367,178 disclose a process in which the oil is extracted from raw lecithin by treatment with carbon dioxide that is supercritical with respect to pressure and temperature, and pure lecithin is obtained as a solid substance.

German Offenlegungsschrift No. 3,229,041 and corresponding U.S. Pat. No. 4,50,513 disclose a process that products a product of low quality. The extracted solids do not have a uniform, powdery consistency.

German Offenlegungsschrift No. 1,493,190 discusses the solubility of many organic compounds in supercritical gases. It shows that penetration of the extraction agent in pasty mixtures is difficult.

German Offenlegungsschrift No. 3,536,622 and corresponding U.S. Pat. Nos. 4,812,233 and 4,828,702 disclose a process and an apparatus for recovering raw lecithin from mucilaginous raw lecithin in which a liquid or supercritical extraction agent which is gaseous under normal conditions is added to the mixture through nozzles disposed in a nozzle ring at the bottom of a cylindrical extraction vessel. The solvent leaves the nozzles with a Reynolds number of more than 40,000 and flows upwardly in the extraction chamber with a Reynolds number between 2700 and 8000. The high shear forces produce a dispersion of the pasty mixture.

German Offenlegungsschrift No. 3,011,185 and corresponding U.S. Pat. No. 4,367,178 disclose a process that requires an uneconomical long extraction period of from 3 to 7 hours. No details are disclosed on what transfers of substances are made in the phases.

German Offenlegungsschrift No. 3,536,622 and corresponding U.S. Pat. Nos. 4,812,233 and 4,828,702 disclose a nozzle device that allegedly reduces the extraction period to about two hours. However, tests reveal lump formation and oil skins so that uniform deoiling could not be achieved.

German Offenlegungsschrift No. 3,329,249 discloses a process for the extraction of form-labile, flowable substances using high pressure extraction and an apparatus for implementing this process. The starting mixture and/or the extraction gas is sprayed into a mixing chamber. In the mixing chamber the extraction gas is mixed with the starting mixture and the extraction agent is charged with the extract. Pressures between 600 bar and 1200 bar are necessary.

German Offenlegungsschrift No. 3,329,249 discloses that a starting mixture, for example raw lecithin, is not precharged with the extraction gas but is sprayed into the mixing chamber and is only there mixed with the extraction gas, with the extraction also taking place there. The separation of pasty or highly viscous mixtures is not economical according to the described process. Despite the use of very high pressures of more than 600 bar, the expensive configuration of two-component nozzles, and the use of small nozzle bores, there is insufficient dispersion of the starting mixture. Also, the danger of clogging precludes operational reliability.

Tests with raw lecithin show that satisfactory extraction of the oil cannot be accomplished with any of the described known processes and apparatuses and thus high quality raw lecithin cannot be recovered.

SUMMARY OF THE INVENTION

The present invention provides an improved method and apparatus for making viscous mixtures accessible to separation by solvent extraction by means of dispersion. The present invention further provides a method for preparing a dispersion. This object and others which will become apparent as the specification progresses, are accomplished by the invention, according to which, briefly stated, a mixture to be treated is charged with a solvent and then sprayed to form a dispersion, which is e.g. thereafter subject to separation.

The method comprises charging a viscous mixture with a liquid or gaseous solvent and spraying the homogenous solution to form a dispersion, contacting said dispersion with a solvent for at least one component of the mixture, dissolving at least one component of the mixture in solvent, and separating the solvent containing at least one component from the remaining components of the mixture. Further steps are removing the solvent containing at least one component from the extraction column, separating solvent from the solvent containing at least one component by pressure reduction and/or change in temperature, and returning the solvent to the extraction column.

The apparatus comprises an extraction column preceded by a charging column, wherein the upper portion of the charging column has a mixture inlet, a solvent inlet, and a liquid distributor, and filler bodies or other suitable inserts which increase the surface area of the mixture to be charged.

BRIEF DESCRIPTION OF THE DRAWING

The Figure illustrates a process according to the invention for the separation of a viscous mixture, for example, for the deoiling of raw lecithin.

DESCRIPTION OF THE INVENTION

The present invention relates to a method and apparatus for separating a viscous mixture by charging a mixture with a liquid or gaseous solvent and spraying the homogenous solution to form a dispersion, contacting said dispersion with a flow of a solvent for at least one component of said mixture, dissolving at least one component of the mixture in solvent, and separating the solvent containing at least one component from the remaining components of said mixture. Further steps are removing the solvent containing at least one component from the extraction column, and separating solvent from the solvent containing at least one component by pressure reduction and/or a change in temperature, and returning the solvent to the extraction stage. The mixture may be charged with solvents which are in the subcritical or supercritical state, and the charging may take place in a charging column or an extraction column. The present invention is useful, for example, for the separation of mixtures by countercurrent extraction with liquid subcritical solvents or with solvents which are in the supercritical state, and the extraction may take place in an extraction column.

The present invention makes it possible to separate even highly viscous, pasty mixtures, for example from the food, petrochemical, cosmetics, pharmaceutical, plastics processing and petroleum processing industries as well as hop extracts, distillation residues, ceramic pastes, plastic melts or the like. According to the present invention, the pre-charging of the starting mixture with a liquid or gaseous solvent, e.g. the supercritical extraction agent provides an easy and controlled dispersion of highly viscous or pasty mixtures which, for example, can be easily separated afterwards. In this way, expensive two-component nozzles which are susceptible to malfunction and excessive pressures are not needed. For optimum dispersion and separation of highly viscous mixtures according to the present invention, it is sufficient to use simple single-component nozzles and pressures between approximately 75 bar and a maximum of about 400 bar. It is also possible to very finely disperse even highly viscous, pasty mixtures in the flowing extraction agent. Although mass transfer is improved considerably, the dispersed particles are coarse enough to settle at the bottom of the extraction vessel after the extraction process and then can be removed.

All subcritical or supercritical extraction agents, liquid or gaseous, may be used as solvents, such as, for example, carbon dioxide, sulfur dioxide, $N_2O$, hydrocarbons, halogenized hydrocarbons, as well as mixtures of these. Carbon dioxide is preferred. Critical temperature is that temperature above which a substance can no longer exist as a liquid. Above critical temperature, a substance can exist only as a gas regardless of the applied pressure. The pressure that must be applied to a substance at its critical temperature in order to achieve a liquid-vapor equilibrium is called is critical pressure. As used herein, supercritical extraction agent refers to a property of a gaseous extraction agent which is above its critical pressure and temperature, and subcritical extraction agent refers to a property of a liquid extraction agent which is below its critical pressure and temperature. The solvent used for charging the mixture may be different from the solvent used for separating the mixture by extraction, but preferably they are the same.

By treating the mixture in this way, the preparation is perfectly suitable for the subsequent extraction. The degree of extraction, the extraction period, and the consistency of the resulting solids are considerably improved over the known separation processes.

It is preferred to charge the mixture with solvent before extraction until the mixture is saturated with the solvent. This procedure decreases expense.

According to a further aspect of the invention, the charging of the mixture with the solvent takes place in a charging column that is connected upstream of the extraction column and from which the charged mixture is drawn off and finely dispersed when sprayed into the extraction column by means of a nozzle system. In the charging column, it is recommended to set the most favorable temperature and pressure conditions for the best possible charging of the mixture with the solvent.

Carbon dioxide is recommended as a solvent for the treatment of highly viscous, pasty mixtures, for example, in the food art, particularly for the deoiling of raw lecithin because of its physiologically unobjectionable nature. Moreover, although explosion protection measures are mandatory for hydrocarbons, they are not required for carbon dioxide.

Particularly favorable conditions for charging raw lecithin in the charging column are at a temperature between approximately 32° and 80° C., preferably between approximately 40° and 60° C., and with a pressure corresponding at least to the critical pressure of carbon dioxide, preferably from approximately 75 to 400 bar.

Favorable conditions for the deoiling of raw lecithin in the extraction column are at a temperature below the critical temperature of carbon dioxide, and with a pressure above the critical pressure of carbon dioxide, preferably from approximately 75 to 400 bar.

As a particularly favorable alternative, the raw lecithin can be deoiled in the extraction column at a temperature between the critical temperature of carbon dioxide and approximately 80° C., and with a pressure higher than the critical pressure of carbon dioxide, preferably between approximately triple the critical pressure and 400 bar.

A further feature of the invention is that the charging and the extraction treatments for raw lecithin are performed with carbon dioxide at the same pressure. Here, it is advantageous that the charging and the extraction regions be connected to the same pressure supply and monitoring system.

This invention also provides an apparatus in which an extraction column is preceded by a charging column. The upper portion of the charging column has a mixture inlet, a solvent inlet, and a liquid distribution for said mixture, as well as filler bodies or other suitable inserts which enlarge the surface area. This arrangement ensures that the mixture is substantially prepared for being charged with solvent.

It is recommended to use a nozzle or nozzle system to disperse the charged mixture to be sprayed, to place the nozzle or nozzle system in the upper portion of the extraction column, and to use a fine filter. In this way, the preparation of the mixture in the charging column will be fully made use of in the subsequent countercurrent extraction since the dispersion is very uniform and can be set for the most favorable particle size for the extraction process.

It is recommended to use a filter at the solvent outlet of the extraction column in order to separate any solid particles that may have been carried along with the solvent.

Moreover, a separator is connected downstream of the extraction column for regeneration of the solvent phase. In the separator, the pressure of the solvent may be reduced to between approximately 30 and 70 bar, at a temperature of approximately 20° to 60° C., in order to separate the dissolved components.

According to a further aspect of the invention, several extraction columns in a cascade or parallel arrangement are connected downstream of the charging column for the discontinuous treatment of the charged mixture. In this way, there is a quasi-continuous discharge of the treated products with charge-wise extraction.

The Figure shows, as an example, a process according to the invention for the deoiling of raw lecithin. Raw lecithin is disposed in a thermostat controlled reservoir container 1 and is conducted through a conduit 2 to a conveying pump 3 where it is compressed to the process pressure of a charging column 7 and is then conducted through a heat exchanger 4, a conduit 5, and a liquid distributor 6, to the upper portion of a charging column 7. The charging column 7 has filler bodies or other suitable inserts which enlarge the surface area of the downward flowing raw lecithin in order to enhance the charging or, more precisely, saturation, of the raw lecithin with supercritical carbon dioxide. The temperature in the charging column 7 is approximately 32° C. to 80° C., preferably 40° C. to 60° C. Preferably, the carbon dioxide pressure in the charging column 7 is between approximately 75 bar and 400 bar. It is particularly advantageous for the pressure in both columns, charging column 7 and a subsequent extraction column 14, to be the same. In the charging column 7, the raw lecithin flows from the top to the bottom and the carbon dioxide phase remains stationary. After a short time, the stationary, supercritical carbon dioxide phase is saturated with the soluble oils so that no further oils can be extracted from the raw lecithin at this point. The saturated raw lecithin charged with carbon dioxide collects in the sump of the charging column 7 and is then extracted from the charging column 7 through a conduit 9 and fed through a pump 10, an heat exchanger 11, and a fine filter 12, to a nozzle or a nozzle system 13.

A fill level regulator 8 coupled with pump 3 ensures that there is always sufficient raw lecithin in the sump of the charging column 7, and the phase entering the conduit 9, although charged with carbon dioxide, is homogeneous.

The conveying output of pump 10 is adjusted so that an optimum pressure difference is maintained between the pressure upstream of the nozzle or nozzle system 13 and the process pressure in the extraction column 14. The optimum pressure difference may be 5 to 40 bar, depending on the consistency of the raw lecithin to be deoiled, which ensures that there is a uniformly fine dispersion of the raw lecithin in the liquid or supercritical carbon dioxide in the extraction column 14. An advantageous, very large specific surface area is created by the fine distribution of the raw lecithin which allows quick deoiling and avoids re-coagulation of the lecithin particles.

Additionally, the uniform production of raw lecithin droplets of a size primarily from approximately 50 $\mu$m to 200 $\mu$m, reduces to a minimum the undesirable discharge of ultrasmall droplets with the carbon dioxide fluid phase. The liquid or supercritical carbon dioxide used for the extraction of the oil from the raw lecithin is fed into the lower portion of the extraction column 14 through a suitable solvent distributor 16. A solvent distributor 16 uniformly distributes the solvent stream over the column cross section and keeps the fine, downward floating lecithin particles in a constant swirling motion in the lower region of the extraction column 14 above the solvent distributor 16. The liquid or supercritical carbon dioxide flows in countercurrent to the fine raw lecithin droplets and is thus increasingly charged with the oil from the raw lecithin, while the slowly downward floating lecithin droplets are increasingly deoiled and finally reach the sump of the extraction column 14 as deoiled, powdery raw lecithin to be removed in charges or continuously through a conduit 15.

A temperature between approximately 20° C. and 31° C. and a pressure of $p > p_K$, preferably 400 bar $> p > 75$ bar, are particularly advantageous for the deoiling of raw lecithin by extraction of the oil with liquid carbon dioxide. If super-critical carbon dioxide is used as the solvent for the extraction of the oil of the raw lecithin, then a temperature between approximately 32° C. and 80° C., preferably 40° C. to 50° C., and a pressure of $p > p_K$, preferably approximately 400 bar $> p > 3$ $p_K$, are used. As used herein, $p_K$ refers to critical pressure.

The carbon dioxide phase charged with the oil from the raw lecithin leaves the top of the reaction column 14 through a conduit 26 and goes through an expansion valve 25 and a heat exchanger 24 into a separator 22 where its pressure is reduced to between approximately 30 bar and 70 bar, preferably between 40 bar and 60 bar, at a temperature of approximately 20° C. to 60° C. The separated oil is collected in a separator 22 and goes through a conduit 31, with the liquid level being set and controlled with the aid of a level regulator 23. The carbon dioxide which is now substantially free of oil leaves the separator 22 through a conduit 21 and, after liquefaction in the heat exchanger 20 and adjustment of the process pressure and the process temperature, is reintroduced by means of a pump 19 and a heat exchanger 18 through a conduit 17 and solvent distributor 16 into the lower portion of the extraction column 14. The gas losses that occur during the process are replaced in that liquid carbon dioxide is removed from a carbon dioxide tank 28 through a conduit 29 and is added to the circulating carbon dioxide by means of a pump 30.

The charging column 7 and the extraction column 14 are connected by a conduit 27 so that the same pressure exists in both columns and the slight consumption of solvent in the charging column 7 is compensated. If the pressure differs, a special solvent supply is provided to replace the spent solvent.

EXAMPLE 1

A raw soy bean lecithin which is highly viscous and pasty at room temperature (20° C.) and is composed of 0.7 weight % water, 35 weight % liquid oil components, and 64.3 weight % acetone insoluble substance (lecithin), was examined in a high pressure viewing cell for its ability to spray. Part of the raw lecithin was saturated with carbon dioxide in a filler body column connected upstream, at 50° C. and 140 bar, while another part was merely heated to 50° C. The viewing cell was filtered with carbon dioxide and a full cone nozzle was installed to spray out the raw lecithin. Temperature and pressure in the viewing cell were varied between 20° C. and 80° C., and between 75 bar and 300 bar, respectively, so that liquid carbon dioxide (at temperatures below 31° C.) as well as supercritical carbon dioxide were present in the viewing cell. The quantities of raw lecithin conducted through the nozzle were adjusted so that pressure differences upstream and downstream of the nozzle outlet could be set between 1 bar and 120 bar.

It was found that the highly viscous, pasty raw lecithin which was not pre-treated with carbon dioxide could not be sprayed in either liquid or supercritical carbon dioxide. Even with pressure differences of more than 60 bar, it was not possible to disperse the raw lecithin material coming out of the nozzle in a non-uniform manner.

By contrast, the raw lecithin saturated with supercritical carbon dioxide had a significantly lower viscosity and superior flow, and excellent ability to spray in the entire temperature and pressure range under examination, with pressure differences of 5 bar to 10 bar being sufficient.

Small pressure differences produce larger raw lecithin droplets, whereas high pressure differences produce a fine spray of the raw lecithin.

Optimum particle size distribution is achieved by setting a constant, optimum pressure difference, which is a function of the consistency of the raw lecithin to be sprayed, the structure of the nozzle system, and primarily of the temperature and the pressure of the fluid medium carbon dioxide. Pressure differences from 10 to 30 bar are particularly suitable for liquid carbon dioxide. Pressure differences from 5 bar to 20 bar are sufficient for supercritical carbon dioxide.

EXAMPLE 2

A raw soy bean lecithin composed of 0.7 weight % water, 35 weight % oil components, and 64.3 weight % acetone insoluble lecithin, was deoiled in the apparatus in the Figure by extraction with liquid carbon dioxide at a temperature of 28° C. and a pressure of 140 bar. The highly viscous raw lecithin was saturated with carbon dioxide at a temperature of 50° C. and a pressure of 140 bar in a filler body column connected upstream. Preliminary tests in a high pressure viewing cell indicated that this pretreated raw lecithin can be sprayed in liquid carbon dioxide with the aid of a suitable nozzle and there is optimum droplet size distribution when the pressure difference upstream of the nozzle and in the extraction chamber is 15 bar to 25 bar. Correspondingly, the raw lecithin saturated with carbon dioxide was conducted through a full cone nozzle at a mass flow of 800 g/h and with a pressure difference of 20 bar and was sprayed in liquid carbon dioxide in an extractor having a diameter of 11 cm and an effective height of 80 cm. The solvent (carbon dioxide) flows in countercurrent to the downward floating lecithin droplets and is thus increasingly charged with the soluble oil from the raw lecithin, while the fine, increasingly deoiled lecithin particles slowly drop to the bottom and collect at the bottom of the extractor as deoiled powdery raw lecithin which is continuously extracted. The carbon dioxide phase charged with the oil and with a small amount of water leaves at the top of the extractor and its pressure is reduced to 50 bar in a subsequent separator at a temperature of 30° C., so that the extracted components are separated. The regenerated carbon dioxide is liquefied by cooling, is brought with the aid of a conveying pump and a heat exchanger to a pressure of 150 bar and a temperature of 28° C. to be fed to the lower portion of the extractor by way of a solvent distributor.

The solvent distributor has a funnel-shaped configuration so that the extraction of a deoiled raw lecithin is facilitated and is provided with several fine bores through which the pressure of the circulating carbon dioxide is reduced from 150 bar to the extraction pressure of 140 bar. Moreover, the bores are arranged so that the exiting carbon dioxide jet cause the downwardly floating lecithin particles to become turbulent only directly above the solvent distributor, while a substantially laminar flow conditions exists above that point. When 84 kg/h of carbon dioxide was used, then 522 g of light yellow, fine, powdery raw lecithin containing 97.6 weight % acetone-insoluble components were obtained per hour from the sump of the extractor, 275 g of light brown oil were obtained per hour in the separator, and the oil contained 1.2 weight % lecithin (as acetone-insoluble substance) and 1.7 weight % water.

EXAMPLE 3

A raw soy bean lecithin composed of 0.7 weight % water, 35 weight % oil, and 64.3 weight % acetone-insoluble lecithin, was deoiled in the apparatus in the Figure by extraction with supercritical carbon dioxide at a temperature of 50° C. and a pressure of 300 bar. The highly viscous raw lecithin was saturated with carbon dioxide at a temperature of 50° C. and a pressure of 300 bar in a filler body column connected upstream. Preliminary tests in a high pressure viewing cell indicated that this pretreated raw lecithin can be sprayed in supercritical carbon dioxide with the aid of a suitable nozzle, and that there is optimum droplet size distribution when the pressure difference upstream of the nozzle and in the extraction chamber is 5 to 10 bar. Correspondingly, the carbon dioxide saturated raw lecithin was sent through a full cone nozzle with a mass flow of 800 g/h at a pressure difference of 8 bar, and was sprayed in supercritical carbon dioxide in an extractor having a diameter of 11 cm and an effective height of 80 cm. The solvent (carbon dioxide) flows in a direction opposite to the floating-down lecithin droplets and is thus increasingly charged with the soluble oil components of the raw lecithin, while the fine, increasingly deoiled lecithin particles slowly drop downwardly and collect at the bottom of the extractor as deoiled, powdery raw lecithin which is removed at the end of the experiment. The carbon dioxide phase charged with the oil and with a small amount of water leaves from the top of the extractor and its pressure is reduced to 50 bar in a subsequently connected separator at a temperature of 30° C., so that the extracted components are separated. The regenerated carbon dioxide is liquefied by cooling, brought to a pressure of 310 bar and a temperature of 50° C. with the aid of a conveying pump and a heat exchanger, and re-introduced into the lower portion of the extractor by a solvent distributor.

The solvent distributor has an annular shape and several fine bores through which the pressure of the circulating carbon dioxide is reduced from 310 bar to the extraction pressure of 300 bar. Moreover, the bores are arranged so that the existing carbon dioxide jets cause the downwardly floating lecithin particles to become turbulent only directly above the solvent distributor, while higher up in a substantially laminar flow exists. After 1.5 hours, the intake of raw lecithin was stopped while the carbon dioxide solvent continued to circulate for another hour at 76 kg/h. Then the carbon dioxide was extracted and 778 g of light yellow, fine, powdery raw lecithin containing 98.1 weight % acetone-insoluble components was removed from the extractor. In the separator, 412 g of light brown oil was obtained which contained 1.3 weight % lecithin (as acetone-insoluble component) and 1.9 weight % water.

It will be understood that the above description of the present invention is susceptible to various modifications, changes and adaptations, and the same is intended to be comprehended within the meaning and range of equivalents of the appended claims.

What is claimed is:

1. A method for the separation of a viscous mixture, comprising:
    a) charging a viscous mixture to be separated with a liquid or gaseous solvent to form a charged system;
    b) spraying said charged system to form a dispersion of said mixture in said solvent;
    c) contacting said dispersion with a flow of a second solvent for at least one component of said mixture;
    d) dissolving said at least one component of said mixture in said second solvent; and
    e) separating said second solvent containing said at least one component from remaining components of said mixture.

2. The method according to claim 1, wherein said charging takes place in a charging column, and said charged system is sprayed into an extraction column.

3. The method according to claim 2, wherein said charging column is connected upstream of said extraction column.

4. The method according to claim 1, wherein said solvent is supercritical with respect to temperature and pressure.

5. The method according to claim 1, wherein said solvent is subcritical with respect to temperature and pressure.

6. The method according to claim 1, wherein said second solvent is supercritical with respect to temperature and pressure.

7. The method according to claim 1, wherein said second solvent is subcritical with respect to temperature.

8. The method according to claim 1, wherein said solvent and said second solvent are the same solvent.

9. The method according to claim 1, wherein said solvent and said second solvent are different solvents.

10. The method according to claim 1, further comprising:
    f) separating said second solvent from said second solvent containing at least one component; and
    g) returning said second solvent to said flow of said second solvent for contacting said dispersion.

11. The method according to claim 10, wherein said separating said second solvent from said second solvent containing at least one component is in a separator.

12. The method according to claim 10, wherein said separator reduces the pressure of said second solvent.

13. The method according to claim 10, wherein said pressure of said second solvent is reduced to 30 to 70 bar at a temperature from 20° to 60° C.

14. The method according to claim 1, wherein said charging and said separating take place at the same pressure.

15. The method according to claim 1, wherein said charging takes place until said mixture is saturated with said solvent.

16. The method according to claim 1, wherein said charging takes place in a charging column.

17. The method according to claim 1, wherein said dispersion comprises droplets of mixture having a size from approximately 50 to 200 μm.

18. The method according to claim 1, wherein said mixture is highly viscous and pasty, and said solvent and said second solvent are carbon dioxide.

19. The method according to claim 18, wherein said mixture is raw lecithin.

20. The method according to claim 19, wherein the charging of raw lecithin is a charging column and takes place at a temperature from 32° to 80° C. and at a pressure above the critical pressure of carbon dioxide.

21. The method according to claim 19, wherein the deoiling of raw lecithin takes place in said extraction column at a temperature below the critical temperature of carbon dioxide and at a pressure above the critical pressure of carbon dioxide.

22. The method according to claim 19, wherein the deoiling of raw lecithin takes place in said extraction column at a temperature between the critical temperature of carbon dioxide and 80° C. and at a pressure above the critical pressure of carbon dioxide.

23. The method according to claim 19, wherein said charging and separating of the raw lecithin with carbon dioxide takes place at the same pressure.

24. An apparatus for the separation of a viscous mixture, comprising:
    a charging column means, wherein the upper portion of said charging column means has a mixture inlet, a solvent inlet, and a liquid distributor, and means for increasing the surface area of the mixture to be charged,
    an extraction column means following said charging column means including a nozzle means disposed in an upper portion of said extraction column means, said extraction column means connected to said charging column means by a conduit means, and
    a separator means following said extraction column means.

25. The method according to claim 1, further comprising:
    f) recovering said at least one component from said mixture to be separated.

26. The method according to claim 1, further comprising:
    f) recovering said remaining components of said mixture to be separated.

* * * * *